US008894216B2

(12) United States Patent
Reichow et al.

(10) Patent No.: US 8,894,216 B2
(45) Date of Patent: Nov. 25, 2014

(54) ACTIVE MASK PROJECTOR PROVIDING DIFFRACTED LIGHT WITH ANIMATION AND NON-RANDOM PATTERNS

(75) Inventors: Mark A. Reichow, Valencia, CA (US); Daniel M. Joseph, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 556 days.

(21) Appl. No.: 12/647,666

(22) Filed: Dec. 28, 2009

(65) Prior Publication Data

US 2011/0157483 A1 Jun. 30, 2011

(51) Int. Cl.
*G03B 21/00* (2006.01)
*G02B 5/28* (2006.01)
*H04N 9/31* (2006.01)
*G02B 27/22* (2006.01)
*G03H 1/22* (2006.01)
*G09F 19/18* (2006.01)
*G03H 1/26* (2006.01)

(52) U.S. Cl.
CPC .......... *H04N 9/3197* (2013.01); *G02B 27/2264* (2013.01); *G03H 1/22* (2013.01); *G03H 1/2205* (2013.01); *G09F 19/18* (2013.01); *H04N 9/3161* (2013.01); *G03H 2001/2218* (2013.01); *G03H 2001/261* (2013.01); *G03H 2222/15* (2013.01); *G03H 2223/12* (2013.01); *G03H 2223/54* (2013.01)
USPC ............... 353/46; 353/75; 362/565; 356/567; 356/569

(58) Field of Classification Search
USPC .......... 359/569, 9; 348/740, 744; 353/26, 30, 353/88, 46, 75, 79–80, 62, 20; 349/129; 362/565, 566, 806, 807, 808, 809, 255, 362/256; 40/437
See application file for complete search history.

(56) References Cited

U.S. PATENT DOCUMENTS

| 2,085,398 A | * | 6/1937 | Taaffe et al. ..................... 40/437 |
| 6,623,144 B2 | * | 9/2003 | Bornhorst ...................... 362/318 |
| 7,048,190 B2 | * | 5/2006 | Meyrueis et al. .............. 235/454 |
| 7,325,928 B2 | * | 2/2008 | Bhowmik et al. ................ 353/30 |
| 7,433,124 B2 | * | 10/2008 | Kim et al. ...................... 359/569 |
| 7,641,345 B2 | * | 1/2010 | Johnson .......................... 353/20 |
| 2002/0085155 A1 | * | 7/2002 | Arikawa ....................... 349/129 |

* cited by examiner

Primary Examiner — Audrey Y Chang
(74) Attorney, Agent, or Firm — Marsh Fischmann & Breyfogle LLP; Kent A. Lembke (57) ABSTRACT

A projector for projecting diffracted light in a selectable pattern and/or animation on a display surface. The apparatus includes a light source providing one or more beams of coherent light from one or more lasers. The apparatus includes a diffraction assembly in the path of the light source to generate diffracted light by diffracting the laser light with one, two, or more diffraction grating patterns and, optionally, with a diffraction glass or other material. An active mask is provided with a raster that receives the diffracted light and that includes a plurality of optical shutter elements that are selectively operable to project a portion of the diffracted light from the active mask toward the display surface. In one example, the active mask includes a liquid crystal display panel to provide a grid of addressable programmable pixels that are turned on and off to project portions of the diffracted light.

16 Claims, 6 Drawing Sheets

ACTIVE MASK PROJECTOR PROVIDING DIFFRACTED LIGHT WITH ANIMATION AND NON-RANDOM PATTERNS

BACKGROUND

1. Field of the Description

The present description relates, in general, to projectors and systems for projecting light upon projector screens and surfaces, and, more particularly, to systems, devices, and methods for projecting light onto a display surface to provide patterns of diffracted light (e.g., diffracted light in select or programmable locations) on a display or projection surface and/or to provide diffracted light with changing locations or patterns so as to animate the projected light to create desirable lighting effects.

2. Relevant Background

There are many settings where it is desirable to provide unique lighting and visual effects. For example, many theme and amusement parks include special lighting to make a ride or show more visually exciting for participants. The lighting along a ride may be used to set a mood or theme of the ride by lowering or raising light levels. Additionally, flashing lights or moving light streams may be used to surprise people on a ride or watching a show or to draw their attention to a particular location. In other settings, lighting and visual displays are used to simulate stars of the night sky or to create a unique atmosphere for a party such as with randomly moving lights as part of a music concert or in a nightclub or similar setting to enhance a dance floor.

Entertainment and event lighting has often been provided through the use of lasers. A laser may be provided in a projector along with optical elements to create a constant or a randomly changing or random display of thousands of pin points of light by having the optical elements stationary or moving within the projector. Such a light show creates a universe of twinkling stars that may be useful in illuminating theaters, discos, nightclubs, and the like and even have residential applications such as for a child's night light. In many settings, holographic effects are used to create smears or layers of light with a projector. Such projections may be used to provide sparkling lights that appear similar to twinkling stars, provide a smearing between pin point lights, and even rainbows. However, these projectors typically are only useful for projecting what appears to be a random lighting display (but that actually repeats with each rotation of a disk) as a particular or single diffraction grating is rotated or moved in front of the light source or to provide a constant effect when a stationary diffraction hologram element or similar optical lens component is placed in front of the light source.

While such projectors are useful in creating interesting displays and effects, there are many applications where it is desirable to provide lighting effects that can be accurately controlled to create a particular pattern or to animate a scene or display. For example, it may be useful to provide a streak of light behind a moving object such as a star, a jet, a fairy, or the like (a three dimensional (3D) object) or a projected video image that is moved across a wall in a theatre or near an amusement park ride car. In one particular instance, an interactive setting may be provided in which garners are able to control movement of a game piece, and it is desirable to project a lighting effect in the wake of the moving game piece. In another setting, it is desirable to project fairy dust or magical clouds of light on a display surface such as a projection screen or a 3D set in programmable patterns and/or in responsive patterns that animate the scene, e.g., to shoot a magical spray of light from a wand.

In such applications, video projectors may be used to provide the desired effects. However, video projectors that are bright enough to create an adequate look or effect (e.g., a desired amount of sparkle or the like) are typically relatively expensive and/or may require relamping to achieve the desired results. Additionally, such video projectors typically are large such that the setting must provide sufficient space for mounting the projector along with the infrastructure to support and run/control the video projector, which is not the case in many entertainment or other lighting applications. Additionally, video projectors typically project light onto a large surface rather than a small pin point or subset of the overall projection area which creates video black issues (e.g., even "dark" areas are undesirably lighted some amount by the video projector) that may ruin or reduce the desired special effect. Additionally, the quality of light may not be as punchy or specular as desired to provide or achieve certain effects such as sparkling stars or points of light which may be achieved better with lasers or the like.

SUMMARY

To address the above and other issues with prior projectors, a projector is described herein that utilizes an active mask to selective project diffracted light. The diffracted light may be provided by a light source delivering light through a diffraction assembly onto a raster of the active mask. The active mask may provide a grid of addressable pixels or optical shutter elements that are selectively operable to pass (through transmission and/or reflection) a portion of the light that is striking or filling the raster onto a display surface or projection screen. The active mask may be operated by a controller to change the set of pixels over time so as to alter the projected pattern size, shape, and/or location so as to allow a variety of patterns to be displayed and also to provide animation (movement of the displayed pattern).

In some embodiments, the light source is one or more lasers providing visible or other (e.g., UV) wavelength coherent light, and the diffraction assembly may include one, two, or more diffraction grating patterns that sequentially diffract the coherent light to create a desired set of shapes and/or lighting effects in the diffracted light provided on the raster. For example, a first disk with one or more diffraction grating patterns may be placed in the path (such as by rotation of the disk by operation of a motor) of the laser's beam, and this may cause the light to be diffracted into numerous beams to provide numerous points or spots of light. A second disk with one or more diffraction grating patterns may be placed in the path downstream from the first disk, and a pattern that is less dense may be used to alter the shapes (e.g., make a star shape more diffuse or the like). The second (or a third) disk may also be rotated during projection to create streaking/smearing of the projected light. Additionally, a sheet of diffraction material (such as rippled glass) may be inserted in the light path to create a further diffraction and/or refraction of the light or portions of the light (e.g. a wobbly or sparkly effect sometimes desired in creating lighting displays) prior to it being delivered to the raster and then projected onto a projection surface.

More particularly, an apparatus is provided for projecting light in a pattern on a display surface. The apparatus includes a light source for outputting light such as one or more beams of coherent light from one or more lasers. The apparatus further includes a diffraction assembly in the path of the light source to generate diffracted light from the light provided by the light source. An active mask is then provided with a raster that is filled with the diffracted light, and the raster may include a plurality of optical shutter elements that are selectively operable to project a portion of the diffracted light from the active mask toward the display surface in the pattern defined by the set of optical shutter elements that are operated to pass the portion of diffracted light.

In one embodiment, the raster includes a grid of addressable pixels providing the optical shutter elements, and these pixels may be operated to reflect or block or to be transmissive or opaque to the diffracted light to project the light. For example, a controller may be included in the apparatus to provide control data (e.g., video information) to define sets of the pixels to define a corresponding series of patterns in the raster for projecting portions of the diffracted light (whereby a location and pattern for the projected light on the display surface is defined by the control data). In one embodiment, the active mask includes a liquid crystal (LC) panel or film that provides the raster and a grid of addressable pixels that are programmable by the control data to be selectively opaque or transparent or to selectively reflect or block the light on the raster to selectively project a portion of the diffracted light. In other embodiments, micro mirror elements are provided as the optical shutter elements that are selectively positioned to reflect the light to either pass it through the mask or to block it (e.g., to "project" a shadow).

The diffraction assembly may take many forms to practice the apparatus. In one case, the diffraction assembly includes a first disk with at least two diffraction grating patterns and a second disk with at least two diffraction grating patterns. During operation of the apparatus, two of the patterns on the two disks are aligned to sequentially diffract the light from the source to create the diffracted light used to fill the raster (e.g., to first produce a set of spots from a laser beam and then to diffuse or shape the spots). In another embodiment, the diffraction assembly includes a first disk with a diffraction grating pattern and a second disk with a differing diffraction grating pattern (e.g., one that is less dense), and when the output light is directed through the two patterns a motor is used to rotate the second disk to create the diffracted light. In yet another example, the diffraction assembly includes a first diffraction grating pattern diffracting the output light from the source, a second diffraction grating pattern subsequently diffracting the output light, and a sheet or thickness of diffraction material (such as ripple glass) that finally diffracts the output light prior to the diffraction assembly providing it to the raster.

DETAILED DESCRIPTION OF THE PREFERRED EMBODIMENTS

The following description is generally directed toward a projection method and corresponding projection systems/projectors for utilizing a light source to provide a lighting effect that can be selectively targeted (e.g., with a particular, programmable pattern and location on a projection surface) and that can be provided with movement or animation. In some embodiments, the light source is one or more lasers that provide a coherent light beam that is monochromatic (e.g., if one laser is used) or multi-colored (e.g., if two or more lasers are used), and a holographic mechanism is used to diffract and/or refract the light from the source to generate a diffracted, projected light display such as numerous shapes, streaks, bursts, and so on that provide a cosmic or magical dust effect. This diffracted light is projected onto a raster (or input portion) of an active mask, which includes a plurality of optical shutters (sometimes, herein, referred to interchangeably as pixels or addressable portions/frames of a panel or mechanical active mask) that can be programmed or controlled to open and close in a manner to define which portion of the diffracted light (created shapes/streaks/effects) is projected from the projector. The projected light, hence, is useful for creating a sparkling effect on a projection surface/display screen that may have a particular (user controllable/selectable) pattern and location and that may change over time to provide an animated lighting effect (e.g., a shooting comet with a trailing sparkling light tail).

Figure 1:
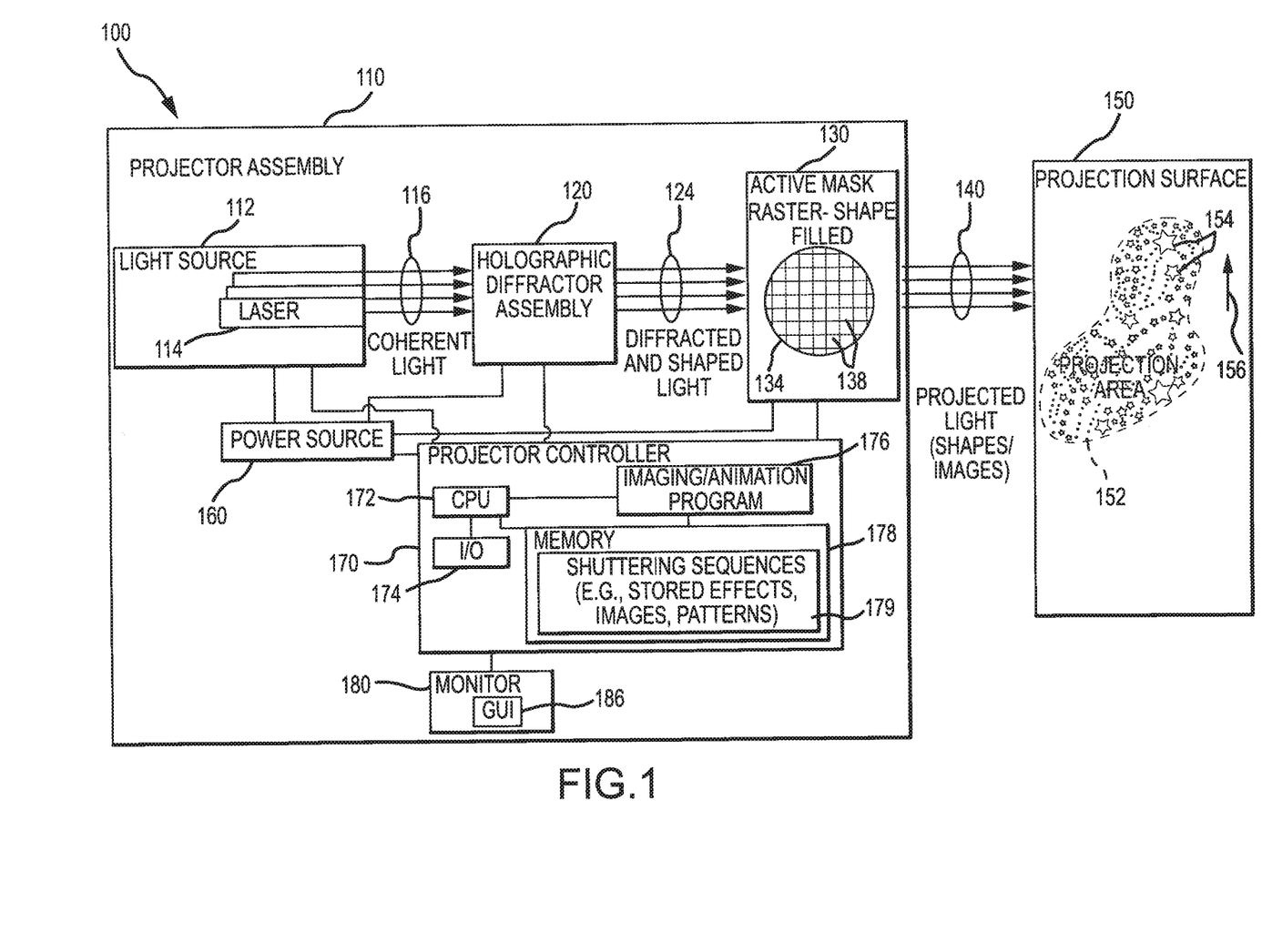
FIG. 1 is a functional block diagram of a projection system for use in projecting diffracted light in programmable or selectable patterns and with animation (e.g., by selectively operating an active mask to project a shape-filled raster)

FIG. 1 illustrates one embodiment of a projection system 100 that is useful for providing adequately bright and well-focused lighting effects that may be of nearly any pattern and size and that may be moved about a projection surface. The system 100 includes a projector assembly 110 that may take a number of forms to implement the system 100. The assembly 110 includes a light source 112, which may, as shown, output a beam(s) 116 of coherent light of one or more wavelengths. For example, the light source 112 may take the form of a combination of one or more lasers 114 to create an appropriate beam 116 of coherent light, which may be nearly any useful color when in the visible wavelengths (such as white, gold, green, blue, red, or the like). In some embodiments, the lasers 114 may include a UV or 405 nm laser, and this wavelength is used in light 116 such that it is invisible to the viewer until it is reflected off of a portion of a projection surface 150 that is treated (such as with UV fluorescing paint or the like).

The projector assembly 110 further includes a holographic diffraction assembly or mechanism 120. The assembly 120 receives the coherent light 116 and diffracts and/or refracts the light 116 to produce diffracted light 124. For example, the assembly 120 may take the form of single or multiple sets of static or rotating (or rotatable) patterns of diffraction grating to create a layered look, e.g., take a single point source and create multiple points of light that may be further diffracted or refracted to create shapes (such as stars, laser bursts, streaks, smears, cosmic/magic sparkling dust/clouds, and the like)

from the points and other effects. While the assembly 120 may include a single optical element to create the diffracted light, embodiments of the assembly 120 often will include 2 or more stackable (or sequentially alignable) elements to allow two or more grating patterns to be used to effect the light 116 to create the diffracted light 124 (e.g., a first diffraction grating pattern followed by a second diffraction grating pattern with a different density or configuration to create a more diffused point source or shape and this diffracted light may further be modified by passing it through additional diffraction material such as a sheet of rippled/wavy glass or the like to refract the light passing through the assembly 120).

The amount of diffraction and/or refraction performed in the assembly 120 may be varied significantly to implement the projector assembly 110 and is chosen to achieve a desired lighting special effect with the projector 110 (e.g., to provide desired shapes and/or images and lighting effects in projected light 140). In some cases, the diffracter assembly 120 may be actively controlled/operated by the projector controller 170 to change the diffraction/refraction provided for light 116 to create a number of differing outputs (diffracted light 124), and this may involve rotating disks/plates with sets of diffraction grating patterns to align two or more different combinations and/or to selectively provide additional diffraction/refraction components (e.g., to insert and/or remove a ripple glass component or the like from the path for the coherent light 116 through the holographic diffracter assembly 120).

The disks can be indexed such that each swatch/pattern used in diffracting light on a disk can be readily selected via its known position in its rotation (e.g., relative to the light source/path of light). This may be achieved, for example, using a potentiometer or other device to determine the position of each indexed pattern/swatch on each disk. Then, controls such as those used in the lighting industry (DMX lighting controls and so on) may be used to select the diffraction pattern in each disk (e.g., a slider control or the like may be used to select a pattern on each disk (e.g., Pattern/Swatch 3 on Disk 1 and Pattern/Swatch 5 on Disk 2 when each has 2 to 3 or more patterns)). In other cases, one or more of the disks, though, may be more freely rotating such that an indexed disk may be combined with a rotating disk in which a particular diffraction pattern (typically one that differs from the first disk) may not be chosen but is instead rotated (in a selective manner) to achieve an on/off smear or similar diffraction effect.

A significant aspect of the projector assembly 110 is the provision of an active mask 130 at the output of or downstream from the diffraction assembly 120. The diffracted light 124 output from the assembly 120 with its holographic effects strikes a receiving surface or raster 134 of the active mask 130. The active mask 130 generally provides a grid of pixels or addressable optical shutters 138 that may be controlled by the projector controller 170 to open and close to allow select portions of the diffracted light 124 to pass as shown as projected light 140. The system 100 includes a projection surface 150 which may take numerous forms such as a conventional projection screen as used to display a video image or any other surface for which it is desirable to light with the projected light 140 (e.g., a portion of an amusement park ride or theater such as a screen, wall, set, or the like). The projected light 140 is provided on a projection area 152 whose shape, size, and location on the surface 150 is defined in part by which ones of the pixels/shutters 138 are opened by the controller 170.

In one embodiment, the active mask 130 includes a liquid crystal (LC) panel or film that provides a panel of material with pixels/optical shutters that can be selectively opened and closed, and when opened, the panel associated with the raster 134 provides a non-polarized, clear panel at the locations of each opened pixel/shutter to allow a portion of the light 124 to pass through the pixels/shutters 138 as projected light 140 having a particular pattern, size, and location as shown with projection area 152. Further, by operating the controller 170 to provide a pixel/shutter control signal differing ones or groups of the pixels/shutters 138 may be opened to change the shape, size, and location of the projected light 140 and projected pattern 152, which may cause the image(s) 152 to move as shown at 156 (e.g., provides animation to the projected light 140 such as a moving streak of diffracted light that may appear to be a moving streak, cloud, or other shape of sparkling shapes (e.g., cosmic or magic dust)). An LC panel-based mask 130 provides addressable pixels/shutters 138 in the raster 134, and such an LC panel may be provided to be programmable or selectively controlled via controller 170 such as in a way to allow an easy user interface (e.g., video media or media applications (such as imaging/animation program 176), bit maps (which may be utilized and/or changed sequentially to produce shuttering sequences 179 to control opening/closing of pixels/shutters 138), and the like).

As shown in the projector assembly 110, a power source 160 may be provided to power the light source 112, the holographic diffraction assembly 120 (such as when electric motors are used to selectively position and/or rotate disks/plates with diffraction patterns), and the active mask 130. The assembly 110 further includes a projector controller 170 that is used to selectively operate the lasers 114 (e.g., to selectively provide light of one or more colors or to provide one or more diffraction effects in some embodiments in which the lasers are focused separately through differing ones or portions of the diffraction assembly 120), the diffraction assembly 120, and the active mask 130 (e.g., to selectively open and close sets of the pixels/shutters 138 to project the light 140 onto the surface 150). The controller 170 may include a processor(s) 172 to run input/output devices 174 (such as a mouse, a keyboard, a touchscreen, or the like to receive user input to program the active mask 130 and/or to select animation/shuttering sequences 179 and the like) and manage memory 178.

The CPU 172 may be used to run executable software or program code devices such as an operating system and other software typical of a computer system and such as an imaging/animation program 176 that may be used by a user of the controller 170/projector assembly 110 to select or create video and/or shuttering sequences 179 stored in memory 178 that are used to selectively control or program the active mask 130. Specifically, the imaging program 176 may be useful for creating video or control signals to select which pixels 138 are opened and closed to create the projected images 154 (stars, bursts, smears of light, and so on) in the projected area 152. The shuttering sequences/video source 179 may define stored effects, images, and patterns for the projected light 140 by defining which pixels 138 are open and in what order/timing and also, in some cases, defining positioning of diffraction grating patterns on wheels/disks in assembly 120 (e.g., see FIG. 2) and/or operation of lasers 114 (e.g., turning one or more lasers 114 on or off to create a desired effect).

The controller 170 may also operate a monitor 180 to provide a graphical user interface (GUI) 186 such as by operation of portions of the video/imaging program 176, and the GUI 186 may be used by an operator of the projector assembly 110 to define the operation of the active mask 130 (e.g., which shutters/pixels 138 are open and in what sequence) and/or to define the images/shapes 154 in the projected light 140 (e.g., which diffraction grating patterns are used and paired together in the diffraction assembly 120 and/or which lasers 114 are used to provide coherent light 116). As will be appreciated, the controller/monitors of assembly 110 may be implemented using one or more computer, electronic, and data storage devices provided in a single housing or communicatively linked (in a wired or wireless manner) together to facilitate digital data transfer.

In reviewing the projector assembly 110 it may be useful to summarize one embodiment of the component path used to produce the projected light 140 with its plurality of shapes, images, colors, and the like produced by a combination of laser light 116 and diffraction/refraction components in holographic assembly 120. The component path of assembly 110 may include a single laser or multiple lasers 114 of appropriate wavelength and power (wattage) to provide coherent light 116. The light 116 may be of a particular/designed color yet maintain a coherency of the output light 116. The beam(s) 116 would be projected through at least a first appropriately designed holographic diffraction grating in assembly 120 designed to produce 124 a series of multiple and variously sized speckles or spot (e.g., the cosmic or magical dust lighting effect). The diffraction components provided by assembly 120 may be static or could rotate on a disk attached to a motor (e.g., a micro electric motor or the like) to create various stars, lens flare shapes, and/or other shapes/lighting patterns in diffracted light 124.

The diffraction assembly 120 may provide a second or next layer of diffraction with a diffraction grating having a pattern that may be less spatially dense than the first/initial diffraction grating pattern. This pattern may also be static or, more typically, rotated via controller 170 on a disk/plate attached to a motor. The second diffraction grating pattern of assembly 120 may be used to transform at least some of the spots or pin points of light created by the diffraction of the first grating pattern (first element of assembly 120) into more diffuse or more diffracted shapes/images such as smears, streaks, and/or bursts of flaring stars, e.g., to create the appearance of sparkles. In some embodiments of the projector assembly 110, separate optical paths of laser light 116 and diffraction gratings may be paralleled and then combined to provide the diffracted light 124 (e.g., the light 116 from two or more lasers 114 may be passed sequentially or separately through the grating patterns or diffraction/refraction components of assembly 120 to provide light 124), such as to create a golden or other colored haze as a layer in the overall look of the light 124. The light 124 passed through the one, two, or multiple diffraction gratings combines to produce and fill a projected raster 134 filled with shaped lights or light effect images such as dust, star bursts, and/or a golden/colored haze.

Next in the optical component path of the projector 110 is an active mask 130. In one embodiment, the active mask 130 takes the form of a non-polarized LC panel with addressable pixels 138. The LC panel 130 may be configured to operate as an active, programmable mask for the light/shape-filled raster 134. By programming (e.g., with program(s) 176 or by feeding signals/video 179 from controller) the pixels 138 within the LC panel 130 to be ON (opaque/closed) or OFF (transparent/open) with media from controller 170, the projector 110 may be used to create moving shapes in projected light 140 as shown with arrow 156 on the projection surface 150. The moving shapes may be provided on an active map that allows the diffracted light 124 filling the raster 134 to be projected through the mask 130 or to be blocked (e.g., project a shadow or true and not video black in non-projected portions of projection surface adjacent to projected area 152). The selective shuttering of the pixels 138 (ON/OFF switching via programming from controller 170) allows the images 154 in projected light to be provided in a streak or path of light that appears to be moving 156 on scrims or various other surfaces 150. Using a laser(s) 114 for the light source 112 allows for the images 154 to always be in focus and to possess a glistening/sparkling quality of light that provides a cosmic/magical effect (magical dust, for example, from a magic wand). In other embodiments, the active mask 130 may take other forms to provide programmable pixels or shutters 138 such as an LCOS (liquid crystal on silicon) panel/device, a DMD (digital micromirror device) panel for direct reflection, a reflective LC panel for LC direct reflection (e.g., found in colored video game devices), digital light processing (DLP™) device, and/or the like.

The lasers 114 may be selected to provide a wide range of colors with varying wavelengths. In one embodiment, the laser 114 may be a standard green laser but invisible orange UV paint is used to treat all or portions of the projection surface 150 to fluoresce yellow light back to the viewer's eye. In other embodiments, though, laser wavelengths of light in the UV range (including, for example, 405 nanometers (nm)) are used in light source 112 to provide lighting tricks/effects with a variety of invisible but fluorescing paints on surface or objects 150. For a more volumetric effect, the projection 140 may be directed onto a rotating helix or plane or scrim creating a 3D cloud of magical/cosmic dust viewable in the round.

Figure 2:
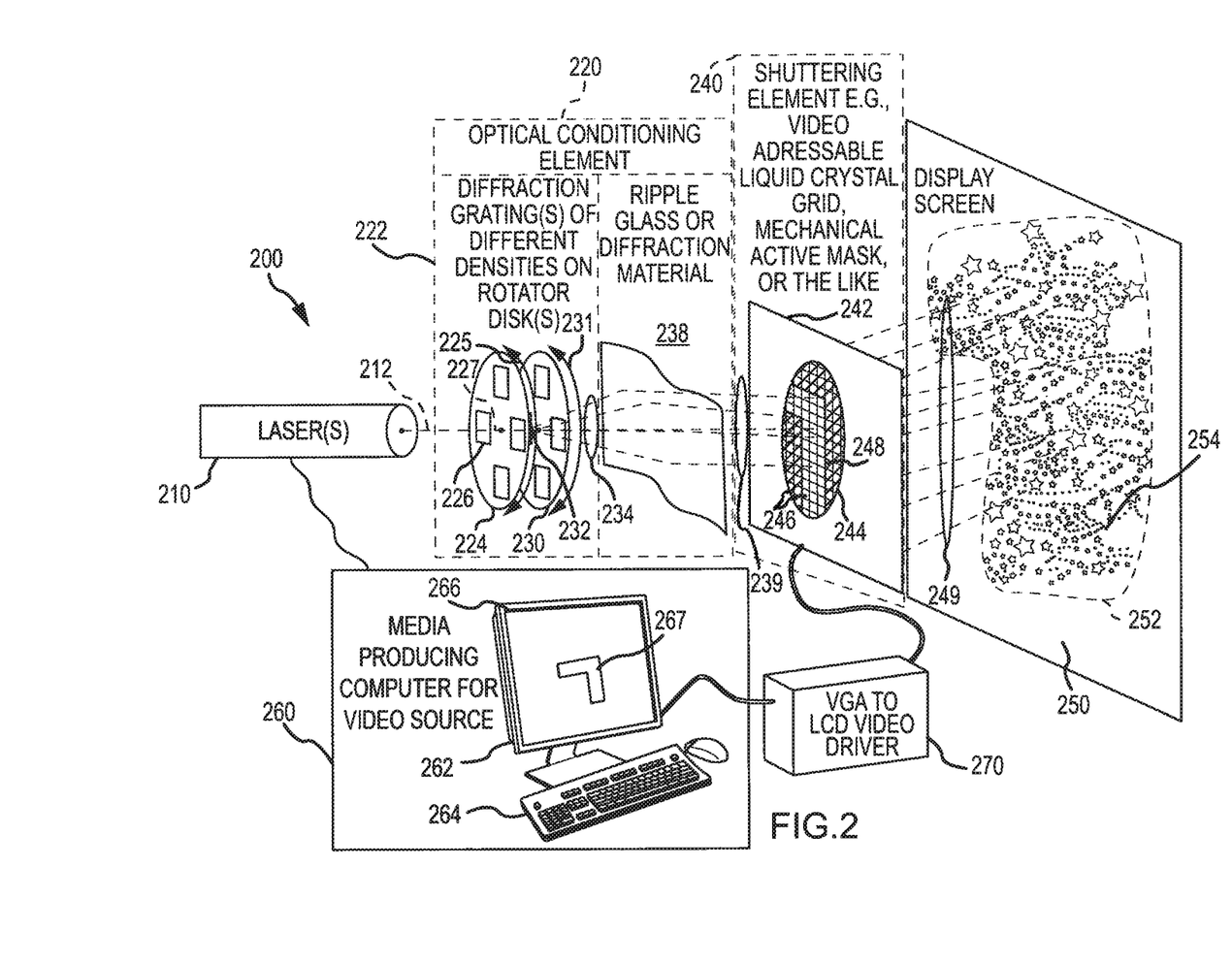
FIG. 2 illustrates another embodiment to a projector according to the present description showing more details including use of two or more stacked diffraction gratings that may be paired or selected to project shapes and images (or diffracted light from a coherent source) in into a raster of a shuttering element or active mask.

FIG. 2 illustrates a projector 200 of an embodiment that provides more detail of how the system 100 of FIG. 1 may be implemented in practice. As shown, the projector 200 includes one or more lasers 210 that each provides a beam of coherent light. For example, the laser 210 may provide a green light beam 212 (e.g., at or near a wavelength of about 580 nm) or another color of visible or non-visible light in beam of coherent light 212. The projector 200 also includes an optical conditioning element 220 that receives the coherent light 212 from the laser(s) 210 and outputs diffracted light 239 to fill or light a raster 244 portion of a shuttering element 240.

The optical conditioning element 220 may include one or more diffraction gratings 222 and/or a diffraction material component (e.g., ripple glass or the like) 238. The gratings 222 for example may include first and second disks 224, 230 that each include one or more diffraction grating patterns 226, 232. Further, each disk 224, 230 may be rotatable (such as by controller 260) to create a streaking or other effect and/or to align two of the patterns 226 on sequential disks 224, 230 (e.g., such that the light 212 is passed through two paired/matched diffraction grating patterns to achieve a desired effect that may vary depending on which two patterns 226, 232 are aligned/used). In one embodiment, the first disk 224 is stationary to select one of the patterns 226 while the second disk 230 is rotated to cause a streaking/smearing effect (or this is an effect that can be chosen via controller 260 as part of a show/effect). In another embodiment, the disks 224, 230 are indexed to allow combinations of patterns 226, 232 on the two disks 224, 230 to be paired and held stationary or rotated together or separately to create a plurality of effects without having to change out the disks 224, 230 to provide differing diffraction grating patterns.

In one embodiment, the first disk 224 includes a number of grating patterns 226 and the light 212 strikes one of these first and is diffracted based on a particular diffraction grating pattern printed/provided on disk 224 such that it produces multiple laser points or spots (e.g., stars, bursts, bubbles, and so on) from the single beam 212 from the laser(s) 210 in light 227. Then, the light 227 is passed through a second diffraction grating pattern 232 in second disk 230 to produce shapes or diffused point sources or shapes in diffracted light 234. This may be achieved by providing the second pattern 232 with a differing (less) density diffraction grating pattern/design and/or by moving 231 the disk 230 relative to the disk 224 (which may also be rotated as shown at 225). The optical conditioning element 220 may further include additional diffraction components such as a disk or sheet of diffraction material 238 (e.g., ripple glass or the like to produce a desired effect such as a "wobbly" look) that may be stationary or moving to further diffract/refract the light 234 to produce diffracted light 239 with desired shapes and effects (such as twinkling spots, streaks/smears, and the like). The diffraction material 238 may also be retractable from the path of light 234 such that in some cases the light 234 is passed directly to the raster portion 244 of the shuttering element 240 (such as by operation of controller 260 to create a particular effect).

Me shuttering element 240 receives the diffracted light 239, which fills a raster portion 244 on an active mask 242. The active mask 242 is configured to provide a plurality of addressable pixels/optical shutters 246 that may be selectively operated to pass a portion of the light 239 through as shown at 249. For example, the active mask 242 may be a liquid crystal grid, a mechanical active mask, or the like that is operable to pass the portion of light 239 striking the pixels 246 in area 248 (e.g., a hockey stick shape or any other pattern definable via pixel selection by controller 260). These pixels may be configured (e.g., OFF such that the pixels are transparent in the LC implementation or open in the active mechanical mask application) to pass the light 239 as shown at 249 through pixels 246 in area 248 of raster 244 to project a pattern 252 of light images 254 onto a display screen/surface 250 (e.g., a cloud of magical, sparkling dust 254 or the like in a shape and location 252 associated or corresponding with the pattern 248 defined in the raster 244 by the controller 260).

The pixels 246 may be designed to have a variety of shapes and sizes to provide the grid of the raster 244. For example, the pixels may be squares that are up to 0.125 inches on a side or even larger to provide a large resolution display (e.g., fine resolution often not required to provide a display 252 with diffracted light). However, in other embodiments, the pixels are relatively small (e.g., similar to those found in a more conventional LC display device) to provide a finer resolution in display 252 on surface 250. The pixels 246 are shown square in panel/mask 242 but other shapes may be used such as circular, triangular, rectangular, hexagonal, and the like (or a combination thereof).

The projector 200 may also include a controller or computer used as a control device 260. The controller 260 may take the form of a conventional computer or similar electronic device with processing capabilities. The controller 260 is shown to include a computer/monitor 262 with I/O devices 264 such as a keyboard and a mouse. The computer 262 may be used to run one or more software programs to create video or other control signals/data that may be processed by a driver 270 (e.g., a VGA (video graphics array) to LC (liquid crystal) video driver or the like) and then provided to the active mask 242 to operate the pixels/shutters 246. In one example, an off-the-shelf program (such as Adobe® After Effects® available from Adobe Systems Incorporated or other animation, video, visual effects, or similar software tools used in the graphics or imaging industries) is used to provide a video source to operate the mask 242 such as by defining pattern 267 in a GUI on screen/display 266 that defines the shape, size, and location of the pattern/portion 248 of open shutters 246 (or pixels that are used to create the display 252 with projected light 249). Generally, the software or media interface tool provided on the computer 262 of controller 260 may provide an interface that treats the mask 242 as a large resolution monitor that may define shapes, streaks, locations, sizes, and other parameters of images by opening and closing pixels 246 of raster 244. Each pixel 246 is typically addressable via its vertical line and horizontal line correlation or other mapping techniques. The media interface tool or other control software may also be used to define diffraction effects (via control of the optical conditioning element 220) and colors/brightness (via control of the laser(s) 210). In some cases, the control data created by the software may take the form of an animation or video file that defines which addressable windows/shutter elements (or pixels) are able to pass light (e.g., by becoming opaque/transparent, by moving mirrors to reflect light through or block light, and the like). For example, an animation file providing a number (such as 24) of frames per second may be used to control the active mask with its programmable and addressable windows/shutter elements (e.g., a pixel grid or matrix) in its raster.

Figure 3A:
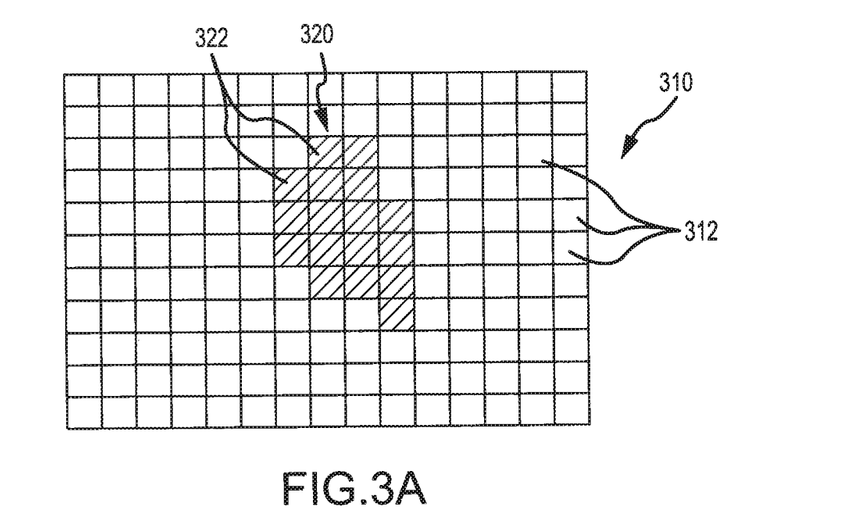
FIGS. 3A and 3B illustrate a raster for an active mask of an embodiment in which a user has operated a controller to open a set of pixels or optical shutters of an active mask and illustrate an exemplary projected image associated with the active mask (e.g., a set of shapes or diffracted light beams with a particular pattern and location on a projection surface)

At this point, it may be useful to provide several examples of use of an active mask-based projector to create a unique lighting effect/display with diffracted light. FIG. 3A illustrates a raster 310 that may be provided as part of an active mask of a projector and that may be mapped via software to a GUI to allow a user to readily select pixels/shutters to create a projected image. Specifically, the raster 310 is shown to have a plurality of pixels/shutters 312, and a user has (via a controller and/or software interface) selected a group or set 320 of the pixels 322 for creating an image or display (shown with cross hatching to indicate that these pixels would be transparent (e.g., OFF in an LC setting) or open). The other pixels 312 are closed or opaque (ON in an LC mask).

Figure 3B:
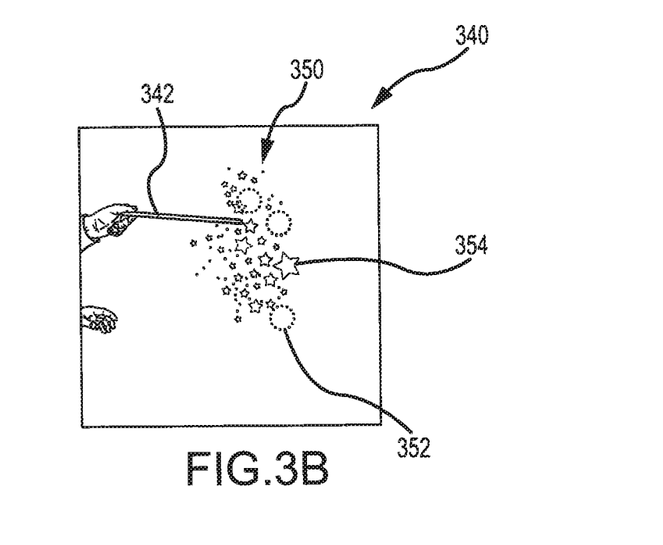

FIG. 3B illustrates an exemplary display 340 that may be created with the raster 310 in this configuration. As shown, the display 340 includes projected light 350 from the pixels 322 of raster 310. The projected light 350 is arranged in a pattern corresponding to the pattern 320 of pixels 322 such as to create a cloud or pattern 350 with shapes 352, 354 as may be created by diffraction gratings (e.g., stars, circular shapes, and so on). The pattern of light 350 may be sized and located based on selection of pixels 322 to be associated with a 2D/3D object 342 or separately projected image 342 in display 340. In the illustrated example, the projected light 350 is a cloud of magical dust 352, 354 at the end of a magic wand 342. The cloud/pattern of light 350 may be relatively stationary in location (and size and shape) or these attributes may be changed over time by modification of the pattern 320 of pixels/shutters 322. The example of FIGS. 3A and 3B are useful for showing the raster 310 of an active mask may be used to create projected light 350 of a particular pattern including the size, shape, and location of such pattern on a display 340. As can be appreciated, the projected light 350 and its shape, location, content, and so on may be controlled via interactive techniques such that the pattern of light 350 may react to a detected position of the object 342 or to user/player inputs (such as in a video game, on a touch screen, and so on).

Figure 4A:
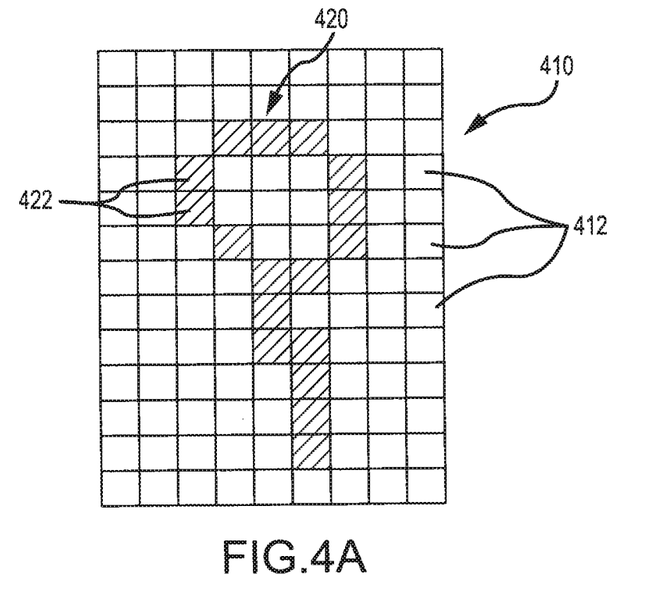
FIGS. 4A and 4B illustrate another raster configuration for an active mask and an associated projection surface used to provide a glittering or sparkling overlay upon a 2D object (image on a surface, image projected on a surface, or the like) or a 3D object.
Figure 4B:
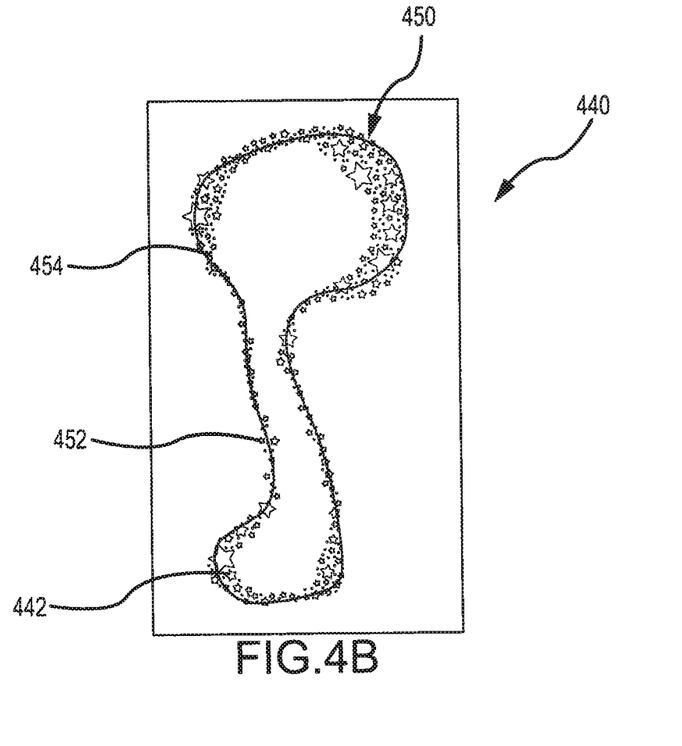

In FIG. 4A, a raster 410 is shown that includes a plurality of pixels/shutters 412, and in this raster 410, a portion 420 of the pixels 422 have been selected (such as via a GUI allowing a user to define an image to display with light) for transmitting light (e.g., to open the shutter such as by selectively making the pixel transparent to the diffracted light filling the raster 410). The pattern 420 is not solid in this case, and FIG. 4B illustrates a display 440 that includes the projected light 450 from the raster 410 that provides a pattern 454 that outlines another projected image or object 442 with sparkling/diffracted shapes/images 452. FIG. 3A-4B are useful in illustrating how use of an active mask allows the projectors described herein to be used to readily define a shape and size of a pattern of diffracted light to project and also to define where on the projected surface the projected pattern will be provided. Additionally, the portions of the rasters 310, 410 that are not selected for projection (not pixels 322, 422) block light and, hence, video black is not a problem as may be the case with more conventional video projection techniques (e.g., the projectors are useful for projecting shadow or only projecting focused light in very discrete selected areas of the displays 340, 440).

Figure 5A:
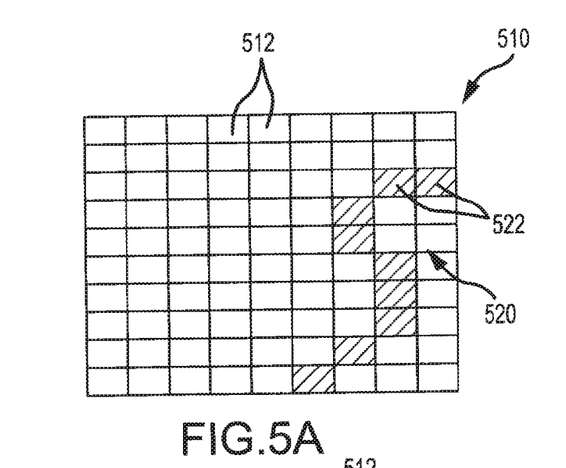
FIGS. 5A to 5D illustrate use of a series of changing raster configurations (sequentially changing patterns of open/closed pixels/shutters of an active mask) to provide an animated or moving/changing projected image.
Figure 5B:
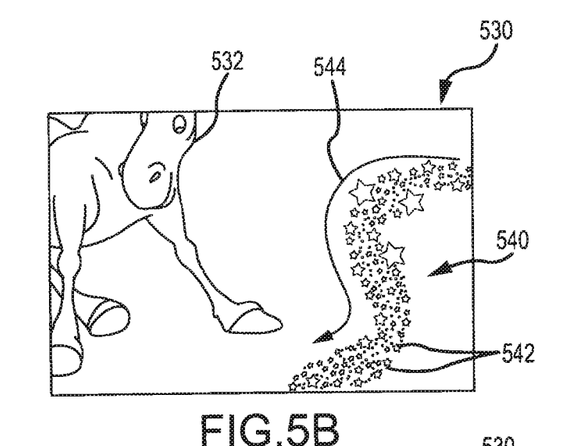
Figure 5C:
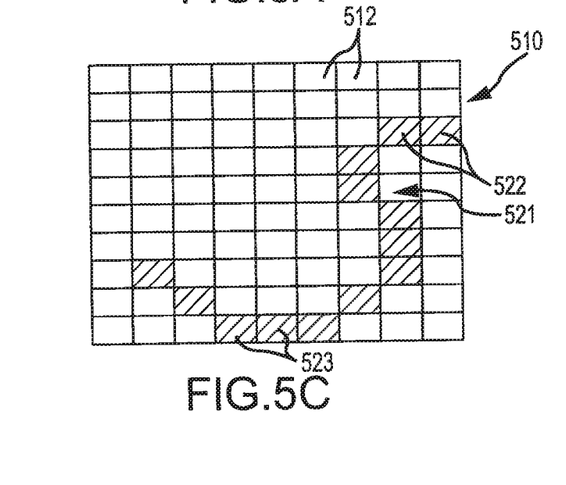
Figure 5D:
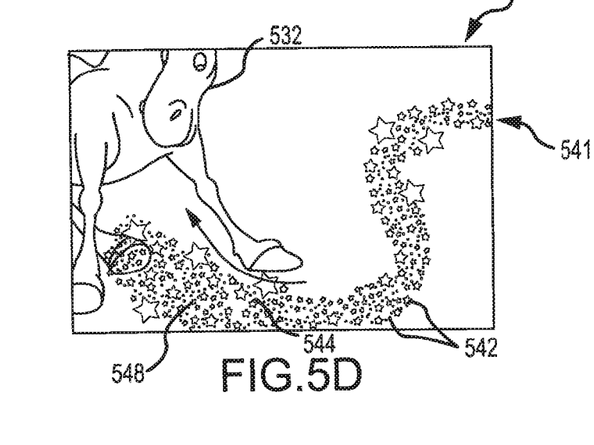

In addition to projecting static patterns/shapes of diffracted light, the projectors described herein may be used to provide animation in the projected light. Such an aspect is shown in FIGS. 5A to 5D. In FIG. 5A, a raster 510 is shown with pixels 512, and a first shape/pattern 520 is defined with selection of pixels 522 for transmitting diffracted light striking the raster 510 in a projector. As a result, the raster 510 in the first configuration shown in FIG. 5A may be used with display 530 to provide a first projected pattern/image 540 with shapes/effects 542. The pattern 540 may be positioned relative to other objects 532 in the display 530, and arrows 544 are provided to indicate that the projected pattern/image 540 is moving or animated as a streak moving across the display. More specifically, animation is provide by a second configuration of the raster 510 shown in FIG. 5C with additional (or different) pixels 523 being selected for use in displaying diffracted light striking the raster 510. As a result as shown in FIG. 5D, the streaking image 541 is shown to have moved 544 further across the display 530 toward (relative to) the object 532 with additional images/shapes 548. As will be appreciated, sequential changing of the pixels 522, 523 over time will cause the display 530 to change and for the patterns 540, 541 to appear animated or to be moving 544. In prior projectors with a simple rotating filter/diffraction plate, such selective animation was not achievable.

Figure 6:
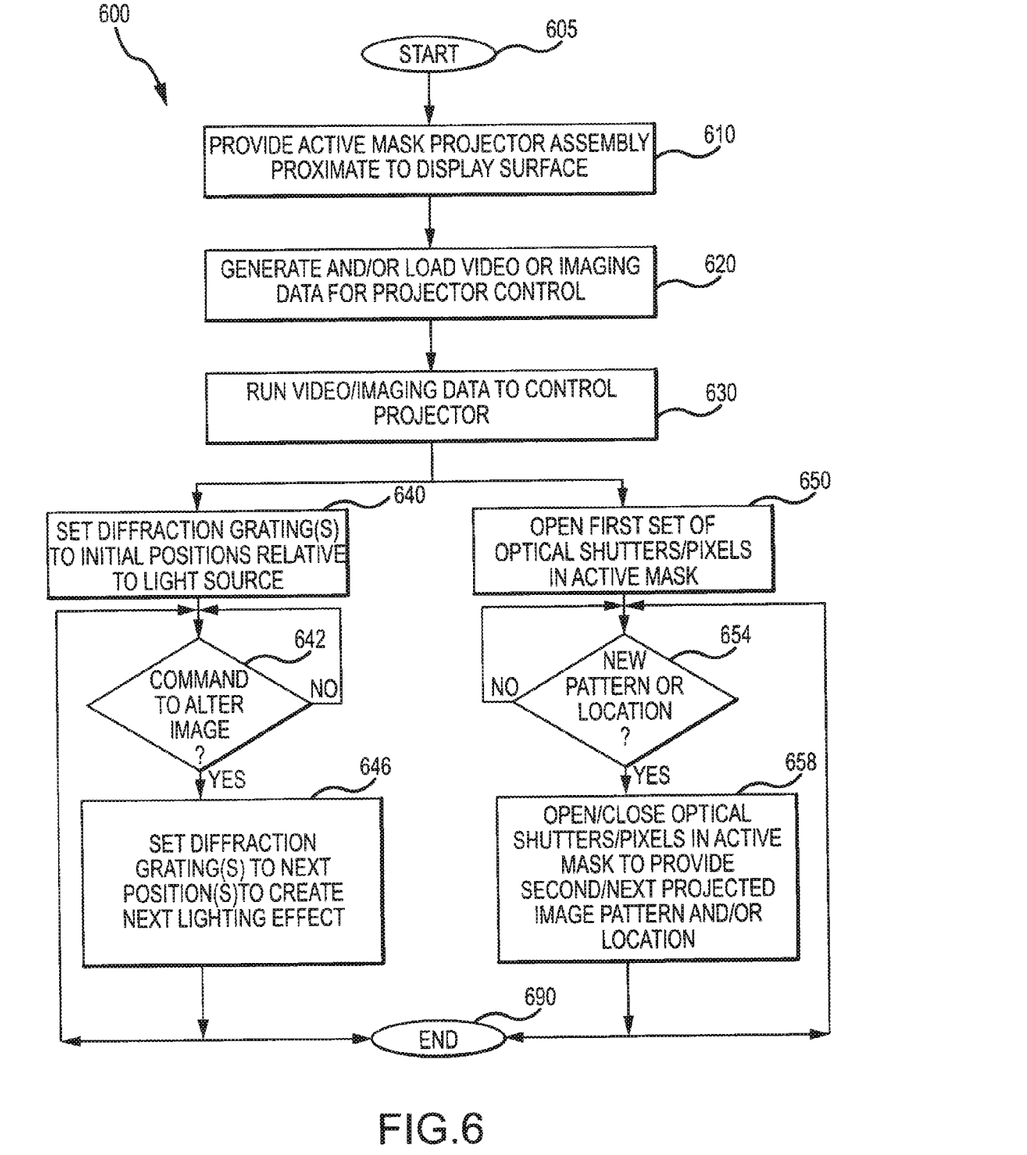
FIG. 6 is a flow chart providing processes of projecting a lighting effect with an active mask projector described herein.

FIG. 6 illustrates a projection process 600 that may be carried out by use and implementation of one of the projectors described herein. The projection process 600 begins at 605 such as with selecting a location for projection and a particular projection surface. Step 605 may also include defining what types of special effects are desired such as star bursts, colored streaks, a static pattern that can be turned on/off, an animated sequence of magic dust, and so on. At 610, the process 600 continues with providing an active mask projector assembly proximate to a display surface(s) such as along the path of an amusement park ride, facing a projection screen/surface in a theater, and so on. The projector may have relatively indefinite focus but a spacing may be selected to achieve a desired size of the displayed/projected light (e.g., to suit the throw of the projector assembly from the outlet of the active mask) and to direct the projected light onto a particular surface or portion of the display surface(s).

At step 620, the method 600 continues with generating and/or loading video or imaging data for use in projector control. For example, a controller may be used to generate media that defines sequential operation of the mask to open/close sets of the pixels/optical shutters to display a number of patterns on the display surface with a variety of shapes, sizes, and locations on the display surface. Additionally, the generated/loaded control data may include commands to set positions and/or rotation of the diffraction grating disks (e.g., to pair or associate two or more diffraction grating patterns and/or diffraction materials to achieve a desired effect). The control data may also set timing of operation of one or more lasers in the light source of the projector assembly. At 630, the video/imaging data is run or used to control operation of the projector or to begin a lighting show or visual effect.

At 640, the process 600 may include (based on the command data) setting diffraction gratings or disks with such grating patterns to initial positions relative to the light source outlet or coherent light path. This may include rotating disks or elements with one, two, or more diffraction grating patterns so as to align select sets of such patterns with the light path through the projector assembly. In this manner, the images and shapes provided in the diffracted light may be defined or set initially (such as to provide a cosmic cloud with laser bursts, stars, and sparking streaks or the like). At 642, the method 600 includes determining whether the command data includes a command to alter the image via changing the diffraction provided to the light from the light source. If not, the method 600 continues at 642.

If yes, the method 600 continues with operating the projector assembly (e.g., micromotors attached to grating disks) to set diffraction grating disks to a next or defined position to create a next desired lighting effect or amount/type of diffraction or refraction. For example, this may include initiating rotation of a diffraction disk to cause a plurality of pin point beams to be more diffuse/smear. In another case, it may involve rotating one or more disks with differing diffraction grating patterns to a second position to provide a differing amount or type of diffraction by forcing the light to pass through a differing diffraction pattern (e.g., providing a new combination of two or more diffraction patterns/materials). The diffracted light output from the diffraction assembly is thus altered based on received control signals/data. The method 600 may end at this or any point at 690 such as by turning off the projector assembly or in response to an end command in control signals from a controller. Alternatively, the method 600 may continue at 642 with awaiting additional changes to the operation of the diffraction assembly (or changes to the position or operation/rotating of the diffraction grating components).

Concurrently or sequentially, the method 600 may also include at 650 opening a first set of optical shutters of (or using a first set of pixels to transmit light through) the active mask. This causes a diffracted light striking the raster to be projected with a first pattern (size and shape) and with a first location. At 654, the method 600 may continue with determining whether a new pattern of pixels or a new location for the current pattern is being provided in the control data or video source (e.g., has the pixel/shutter set been changed). If not, the method 600 continues at 654. If yes, the method 600 may continue at 658 with opening/closing optical shutters/pixels in the active mask to provide a second/next projected image pattern and/or to change the patterns projected location. The method 600 may end at 690 or continue again at 654.

The above described invention including the preferred embodiment and the best mode of the invention known to the inventor at the time of filing is given by illustrative examples only. It will be readily appreciated that many deviations may be made from the specific embodiments disclosed in the specification without departing from the spirit and scope of the invention. The above description provides a projection system that uses one or more lasers as a light source to provide diffracted light selectively projected by an active mask with programmable pixels/optical shutters to project light with high quality (and that can be patterned selectively and animated by operating the pixels/shutters). The projected light is useful for providing "punchy" specularly reflective light that emulates magical/cosmic dust (e.g., golden sparkling dust), bursts of stars (e.g., white or other colors), and other shapes. The use of lasers provides infinite focus as compared with a typical video projector. The projectors described may be configured with a small form factor that may be packaged within relatively small boxes/containers (e.g., the size of a typical ripple disk projector), which makes it easy to hide these projectors in discrete, small spaces to facilitate staging and camouflaging the special lighting effects. In some cases, the projector controller may be operated based on (or by running) on-board media storage (e.g., media/control signals for the active mask) and/or by triggering from various external controls (such as ride or show signals when the projectors are used as part of rides and/or shows).

In some embodiments, the first portion of the projector may be provided with off-the-shelf components. For example, a projector useful for providing a field of stars or a similar pattern may be useful for providing the light source and the first or initial diffraction grating pattern of a projector, e.g., a BlissLights™ 50 or other product available from BlissLights, Inc. may be built upon to fabricate a projector of the present description. The diffraction gratings or grating patterns that may be used may vary widely to implement a projector according to the above description and following claims. In this description, a diffraction grating pattern is intended to include nearly any optical component with a pattern (e.g., regular pattern) that splits, disperses and/or diffracts light such as into several beams traveling in differing directions or into a more diffuse form of the same beam/shape.

We claim:

1. An apparatus for projecting light in one or more patterns on a display surface, comprising:
   a light source outputting light;
   a diffraction assembly comprising one or more diffraction grating patterns diffracting the output light from the light source to generate a number of points, spots, or shapes in the output light from the light source; and
   an active mask with a raster receiving the output light from the diffraction assembly, the raster comprising a plurality of programmable optical shutter elements selectively operable to pass portions of the output light in the one or more patterns on the display surface, including a subset of the number of points, spots, or shapes provided in the output light received by the raster from the diffraction assembly for projection from the active mask, wherein the passed portions are projected at differing locations over time on the display surface such that the passed portions move over time on the display surface.

2. The apparatus of claim 1, wherein the optical shutter elements comprise a grid of addressable pixels selectively operable to pass the portions of the output light received by the raster toward the display surface.

3. The apparatus of claim 2, further comprising a controller providing control data defining sets of the addressable pixels to define a series of patterns in the raster for projecting the portions of the output light received by the raster, whereby a plurality of locations and patterns for the projected differing portions is defined by the controller.

4. The apparatus of claim 1, the active mask comprises a liquid crystal (LC) panel and wherein the shuttering elements comprise addressable pixels that are operable to be selectively opaque and transparent to project the portions and to selectively reflect or block other portions of the output light received by the raster.

5. The apparatus of claim 4, further comprising a controller providing a video to define the portions of the output light and a driver for converting the video into a set of the addressable pixels to be transparent to the portions of the output light received by the raster.

6. The apparatus of claim 1, wherein the light source comprises a laser, wherein the diffraction assembly comprises a first disk with at least two diffraction grating patterns and a second disk with at least two diffraction grating patterns, and wherein two of the diffraction grating patterns in the first and second disks are aligned to sequentially diffract the output light to generate the diffracted light.

7. The apparatus of claim 1, wherein the diffraction assembly comprises a first disk with a diffraction grating pattern and a second disk with a differing diffraction grating pattern, wherein the output light from the light source is directed through the diffraction grating patterns of the first and second disks, and wherein the diffraction assembly comprises a motor linked to the second disk rotating the second disk to generate the diffracted light.

8. The apparatus of claim 1, wherein the light source comprises at least one laser providing the output light, wherein the diffraction assembly comprises a first diffraction grating pattern, a second diffraction grating pattern, and a sheet of diffraction material, and wherein the output light is directed sequentially through the first diffraction grating pattern, the second diffraction grating pattern, and the diffraction material to generate the diffracted light provided to the raster.

9. The method of claim 1, wherein the optical shutter elements are further operable to, concurrently with the passing of the portions of the output light, block other portions of the output light received by the raster from being transmitted through the active mask with the portions, whereby light is only projected on a discrete area of the display surface.

10. The method of claim 1, wherein the number of points, spots, or shapes include multiple points of lights.

11. The method of claim 10, wherein the multiple points of light are further diffracted or refracted by one of the disks to create shapes including one or more of stars, spots, speckles, lens flare shapes, flaring stars, bursts, streaks, smears, sparkling dust, sparkling clouds, and bubbles.

12. A projector, comprising:
    a source of coherent light;
    a diffraction assembly comprising a first diffraction grating pattern diffracting the coherent light to produce multiple light spots and a second diffraction grating pattern, downstream of the first diffraction grating pattern, diffracting each of the light spots to produce a diffracted light comprising a plurality of shapes or point sources produced from the light spots, wherein the second diffraction grating pattern differs from the first diffraction grating pattern, and
    an active mask with a grid of addressable pixels selectively operable to block or pass through the diffracted light passing through the diffraction assembly, wherein the projector projects a pattern filled with the diffracted light and wherein at least one of a boundary shape, a size, and a location of the projected pattern of the diffracted light is modified over time by operation of the active mask.

13. The projector of claim 12, wherein the diffraction assembly further comprises a first rotatable disk including the first diffraction grating pattern and a second rotatable disk including the second diffraction grating pattern and wherein the diffraction assembly further includes at least one motor for selectively rotating the first and second disks to align the first and second diffraction grating patterns in a path of the coherent light.

14. The projector of claim 13, wherein the first and second rotatable disks each further comprise additional diffraction grating patterns differing from the first and second diffraction grating patterns.

15. The projector of claim 13, wherein the motor is operable to rotate the second disk in an ongoing manner to diffract the coherent light.

16. The projector of claim 12, wherein the diffraction assembly further comprises a sheet of diffraction material in the path of the coherent light to further diffract the coherent light after it passes through the second diffraction grating pattern.

\* \* \* \* \*